United States Patent
Fukao et al.

(10) Patent No.: US 11,239,004 B2
(45) Date of Patent: Feb. 1, 2022

(54) CONDUCTIVE RESIN COMPOSITION AND CONDUCTIVE STRUCTURE USING SAME

(71) Applicant: PANASONIC INTELLECTUAL PROPERTY MANAGEMENT CO., LTD., Osaka (JP)

(72) Inventors: Tomohiro Fukao, Osaka (JP); Tomoaki Sawada, Osaka (JP); Takatoshi Abe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/041,791

(22) PCT Filed: Mar. 29, 2019

(86) PCT No.: PCT/JP2019/013977
§ 371 (c)(1),
(2) Date: Sep. 25, 2020

(87) PCT Pub. No.: WO2019/189750
PCT Pub. Date: Oct. 3, 2019

(65) Prior Publication Data
US 2021/0027909 A1    Jan. 28, 2021

(30) Foreign Application Priority Data
Mar. 30, 2018   (JP) .............................. JP2018-069000

(51) Int. Cl.
| H01B 1/22 | (2006.01) |
| C08F 220/32 | (2006.01) |
| C08K 3/04 | (2006.01) |
| C08K 3/08 | (2006.01) |

(52) U.S. Cl.
CPC ........... *H01B 1/22* (2013.01); *C08F 220/325* (2020.02); *C08K 3/04* (2013.01); *C08K 3/08* (2013.01); *C08F 2800/20* (2013.01); *C08K 2003/0806* (2013.01); *C08K 2201/001* (2013.01); *C08K 2201/014* (2013.01)

(58) Field of Classification Search
CPC ...................................................... H01B 1/22
See application file for complete search history.

(56) References Cited

U.S. PATENT DOCUMENTS

| 2003/0162128 A1 | 8/2003 | Song et al. |
| 2009/0227752 A1* | 9/2009 | Lu ..................... C09D 133/068 526/273 |
| 2013/0142963 A1 | 6/2013 | Kirk et al. |
| 2018/0230287 A1 | 8/2018 | Shiozawa |
| 2020/0392349 A1* | 12/2020 | Kang ................... C09D 167/00 |

FOREIGN PATENT DOCUMENTS

| JP | 2015-506061 | 2/2015 |
| JP | 2015-101606 | 6/2015 |
| JP | 2015-178597 | 10/2015 |
| JP | 2016-191043 | 11/2016 |
| JP | 2016-216636 | 12/2016 |
| JP | 6165002 | 7/2017 |
| WO | 2016/114278 | 7/2016 |
| WO | 2017/026420 | 2/2017 |

OTHER PUBLICATIONS

Official Communication issued in International Patent Application No. PCT/JP2019/013977, dated Jun. 25, 2019, along with an English translation thereof.

* cited by examiner

*Primary Examiner* — William D Young
(74) *Attorney, Agent, or Firm* — Greenblum & Bernstein, P.L.C.

(57) ABSTRACT

A conductive composition is provided and at least includes an acrylic resin and a conductive powder, wherein the acrylic resin at least contains a polymer unit (A) of a (meth)acrylate having an epoxy group and a polymer unit (B) of a (meth)acrylate having an isobornyl group, and an amount of the polymer unit (B) is 5.0 parts by mass or more and 50.0 parts by mass or less based on 100 parts by mass of the acrylic resin.

9 Claims, No Drawings

CONDUCTIVE RESIN COMPOSITION AND CONDUCTIVE STRUCTURE USING SAME

TECHNICAL FIELD

The present invention relates to a conductive composition and a conductive structure including the same.

BACKGROUND ART

There is an increasing demand for wearability and shape following properties for devices and conductive materials used in various interfaces in the field of electronics, in particular, sensors, displays, artificial skin for robots and the like. There is a demand for flexible devices that can be placed on a curved surface and an uneven surface, or can be freely deformed depending on the application.

Thus, as a conductive material having flexibility (extensibility), a combination of a conductive metal and a resin having extensibility has been studied.

For example, Patent Literature 1 discloses a conductive composition containing at least one selected from a block copolymer and a functional group-containing elastomer; and a chain-like silver powder. Patent Literature 2 also describes a conductive composition containing a block copolymer and a silver powder. Patent Literature 3 also describes a conductive film containing a metal powder and a resin (rubber). Patent Literature 4 discloses a conductive composition containing an organic silicon compound having a crosslinkable silicon group, and a conductive filler, Patent Literature 5 discloses a conductive paste containing a conductive powder and an elastomer base material (silicone rubber polymer), and Patent Literature 6 discloses a conductive metal composition including silver particles and a thermoplastic polyester resin. Patent Literature 7 also discloses a heat curing conductive paste containing an epoxy resin and another polymerizable monomer (including a monomer having an isobornyl group).

However, though the conductive composition including a block copolymer and the like; and a silver powder as described in Patent Literatures 1 and 2 above, is certainly excellent in extensibility, it has a problem in that the low Tg segment in the block copolymer and the aliphatic urethane acrylate and the like that constitutes the functional group-containing elastomer cause a large residual strain when the conductive composition is contracted and expanded, and result in a large resistance value change when the conductive composition is repeatedly contracted and expanded. The resistance value also becomes large, resulting in a problem in actual use as a wiring. Further, the conductive composition has poor heat resistance, and thus has, for example, a problem in that component mounting by soldering cannot be performed.

The conductive film described in Patent Literature 3 appears to have both contraction and expansion properties and conductivity. However, the conductive film also has a problem of a large resistance value change when it is repeatedly contracted and expanded.

The conductive composition and the conductive paste described in Patent Literature 4 and Patent Literature 5 have a low surface free energy, and thus have a problem in that the base material adhesion tends not to be obtained.

Further, the conductive metal composition described in Patent Literature 6 also has low heat resistance, and thus has, for example, a problem in that component mounting by soldering cannot be performed.

Findings of the present inventors also have proved that inclusion of only an epoxy group and an isobornyl group, as in the case of the conductive paste described in Patent Literature 7, is not enough to obtain a composition that has both contraction and expansion properties and conductivity, and a suppressed resistance value change when the composition is repeatedly contracted and expanded.

The present invention has been made in view of such actual circumstances. It is an object of the present invention to provide a conductive composition that is excellent in conductivity and extensibility, and has a suppressed resistance value change even when it is repeatedly contracted and expanded; and a conductive structure including the conductive composition.

CITATION LIST

Patent Literature

Patent Literature 1: WO 2017/026420 A1
Patent Literature 2: JP 2015-178597 A
Patent Literature 3: WO 2016/114278 A1
Patent Literature 4: JP 2016-216636 A
Patent Literature 5: JP 6165002 B2
Patent Literature 6: JP 2015-506061 A
Patent Literature 7: JP 2016-191043 A

SUMMARY OF INVENTION

As a result of intensive studies, the present inventors have found that the above-mentioned problems can be solved by a conductive composition having the following structure, and have further studied based on such findings, thereby completing the present invention.

That is, the conductive composition according to one aspect of the present invention at least includes an acrylic resin and a conductive powder, wherein the acrylic resin at least contains a polymer unit (A) of a (meth)acrylate having an epoxy group and a polymer unit (B) of a (meth)acrylate having an isobornyl group, and an amount of the polymer unit (B) is 5.0 parts by mass or more and 50.0 parts by mass or less based on 100 parts by mass of the acrylic resin.

According to the present invention, there can be provided a conductive composition that is excellent in conductivity and extensibility, and has a suppressed resistance value change even when it is repeatedly contracted and expanded, and a conductive structure including the same.

DESCRIPTION OF EMBODIMENTS

Hereinafter, though embodiments according to the present invention will be specifically described, the present invention is not limited thereto.

Hereinafter, the components included in the conductive composition of the present embodiment will be described. The conductive composition of the present embodiment is a composition before being cured (uncured or semi-cured composition). That is, epoxy groups in the polymer unit (A) described below are in an uncrosslinked state.

The conductive composition of the present embodiment can also be used as a cured product, and the cured product herein refers to a state after completion of curing reaction through a process of giving sufficient energy such as heat and light to cure the conductive composition. The cured product of the conductive composition of the present embodiment is excellent in heat resistance, dose not exhibit plasticity even when heat is further applied, and is insoluble and infusible.

(Acrylic Resin)

The conductive composition of the present embodiment includes an acrylic resin as a main component. The acrylic resin herein refers to a polymer compound obtained by polymerizing a compound having at least one acryloyl group or methacryloyl group. In the present embodiment, the acrylic resin serves as a binder and imparts extensibility to the cured product of the composition. In the present embodiment, the term "having extensibility" means that the extension percentage at break is 5.0% or more, preferably 10% or more, more preferably 25% or more, further preferably 50%, most preferably 100%. The elastic modulus in tension at room temperature of 25° C. is 0.5 MPa to 0.5 GPa, preferably 1 MPa to 300 MPa, more preferably 5 MPa to 100 MPa. Meanwhile, though the upper limit of the contraction and expansion properties of the base material need not be particularly limited, it is preferably not more than 500% from the viewpoint of impairment of the original shape when the base material is expanded more than necessary. The extension percentage in the present embodiment is represented by the elongation at break [%] in Examples.

The acrylic resin preferably includes an acrylic resin having a glass transition temperature (Tg) of 20° C. or lower to more surely impart extensibility. The acrylic resin contains a polymer unit (A) of a (meth)acrylate having an epoxy group and a polymer unit (B) of a (meth)acrylate having an isobornyl group.

(Polymer Unit (A) of (meth)acrylate Having Epoxy Group)

In the present embodiment, the acrylic resin contains a polymer unit (A) of a (meth)acrylate having an epoxy group. The polymer unit (A) imparts a crosslinking point to the acrylic resin of the present embodiment and makes it curable. When the acrylic resin has an epoxy group, the heat resistance of the cured product after heat curing is improved.

Though the content of the polymer unit (A) is not particularly limited, the epoxy equivalent based on a total amount of the acrylic resin is preferably about 400 to 10,000 g/eq. Presumably, when the epoxy equivalent is in such a range, a conductive composition having heat resistance and an appropriate elastic modulus can be obtained more surely. When the epoxy equivalent is less than 400 g/eq, the elastic modulus after curing is too high, which may result in breaking during extension. When the epoxy equivalent is more than 10,000 g/eq, the elastic modulus after curing is low, and the stability of resistance value may deteriorate.

Specific examples of the (meth)acrylate monomer that constitutes the polymer unit (A) include glycidyl(meth)acrylate, β-methylglycidyl (meth)acrylate, β-ethylglycidyl (meth)acrylate, glycidyl vinyl ether, o-vinylbenzyl glycidyl ether, m-vinylbenzyl glycidyl ether, p-vinylbenzyl glycidyl ether, o-isopropenyl benzyl glycidyl ether, m-isopropenyl benzyl glycidyl ether, and p-isopropenyl benzyl glycidyl ether. These can be used alone or in combination of two or more.

(Polymer Unit (B) of (meth)acrylate Having Isobornyl Group)

In the present embodiment, the acrylic resin further contains polymer unit (B) of a (meth)acrylate having an isobornyl group. Due to the inclusion of this polymer unit (B) component having an isobornyl group, as described above, there can be obtained a conductive composition having excellent conductivity and extensibility, and having excellent electric resistance stability because the resistance value dose not significantly change even when the composition is repeatedly contracted and expanded. More specifically, presumably, due to the possession of an isobornyl group by the acrylic resin contained in the above-mentioned composition, the structure imparts a steric hindrance effect, and the residual strain during contraction and expansion can be reduced. As a result, the resistance value does not significantly change even when the conductive composition is repeatedly contracted and expanded, and thus the conductive composition has excellent electric resistance stability.

The acrylate or (meth)acrylate having an isobornyl group is not particularly limited, and examples thereof include isobornyl (meth)acrylate.

The conductive composition of the present embodiment contains 5.0 parts by mass or more and 50.0 parts by mass or less of the polymer unit (B) component based on 100 parts by mass of the acrylic resin. When the content is within this range, the above-mentioned effects can be obtained. When the content of the polymer unit (B) component is lower than this, the change of the electric resistance cannot be sufficiently suppressed. When the content is more than the above-mentioned range, the reactivity of the polymer unit (A) of a (meth)acrylate having an epoxy group becomes low, and the heat resistance of the conductive composition after heat curing is poor. Thus, the content of more than the above-mentioned range is nor preferable. In addition, the viscosity of the conductive composition increases, which is not preferable from the viewpoint of printability.

(Polymer Unit (C) of (Meth)acrylate Having Nitrile Group)

In the present embodiment, the acrylic resin can further contain a polymer unit (C) of a (meth)acrylate having a nitrile group. Presumably, by further inclusion of a (meth)acrylate having a nitrile group, nitrile groups are hydrogen-bonded each other, thus the composition can be prevented from becoming too soft, and the heat resistance is also further improved.

The (meth)acrylate having a nitrite group is not particularly limited, and specific examples thereof include acrylonitrile and methacrylonitrile.

The conductive composition of the present embodiment preferably includes 5.0 parts by mass or more and 30.0 parts by mass or less of the polymer unit (C) component based on 100 parts by mass of the acrylic resin. Presumably, when the content is within this range, the elastic modulus in the cured product is in an appropriate range and the stability of resistance value is further improved. The acrylic resin can contain polymer units other than the polymer units (A), (B) and (C).

Specific examples thereof include an acrylic monomer represented by the following formula (1).

[Chemical formula 1]

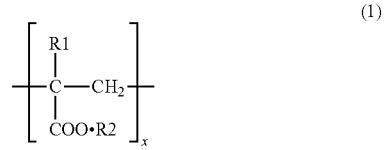

In the above formula (1), R1 is hydrogen or a methyl group, and R2 is hydrogen or an alkyl group.

Examples of the monofunctional (meth)acrylic compound having one acryloyl group or methacryloyl group include, but are not limited to, phenoxyethyl (meth)acrylate, phenoxy-2-methylethyl (meth)acrylate, phenoxyethoxyethyl (meth)acrylate, 3-phenoxy-2-hydroxypropyl (meth)acrylate, 2-phenylphenoxyethyl (meth)acrylate, 4-phenylphenoxyethyl (meth)acrylate, 3-(2-phenylphenyl)-2-hydroxypropyl (meth)acrylate, EO-modified p-cumylphenol (meth)acrylate, 2-bromophenoxyethyl (meth)acrylate, 2,4-dibromophenoxyethyl (meth)acrylate, 2,4,6-tribromophenoxyethyl (meth)acrylate, EO-modified phenoxy (meth)acrylate, PO-modified phenoxy (meth)acrylate, polyoxyethylene nonyl phenyl ether (meth)acrylate, 1-adamantyl (meth)acrylate, 2-methyl-2-adamantyl (meth)acrylate, 2-ethyl-2-adamantyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, 4-butylcyclohexyl (meth)acrylate, acryloylmorpholine, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth)acrylate, benzyl (meth)acrylate, tetrahydrofurfuryl (meth)acrylate, butoxyethyl (meth)acrylate, ethoxydiethylene glycol (meth)acrylate, polyethylene glycol mono (meth)acrylate, polypropylene glycol mono (meth)acrylate, methoxyethylene glycol (meth)acrylate, ethoxyethyl (meth)acrylate, methoxy polyethylene glycol (meth)acrylate, methoxy polypropylene glycol (meth)acrylate, 1-naphthylmethyl (meth)acrylate, 2-naphthylmethyl (meth)acrylate, diacetone (meth)acrylamide, isobutoxymethyl (meth)acrylamide, N,N-dimethyl (meth)acrylamide, t-octyl (meth)acrylamide, dimethylaminoethyl (meth)acrylate, diethylaminoethyl (meth)acrylate, 7-amino-3,7-dimethyloctyl (meth)acrylate, N,N-diethyl (meth)acrylamide, and N,N-dimethylaminopropyl (meth)acrylamide.

Examples of the polyfunctional (meth)acrylic compound having two or more acryloyl groups or methacryloyl groups include, but are not limited to, trimethylolpropane di(meth)acrylate, trimethylolpropane tri(meth)acrylate, EO-modified trimethylolpropane tri(meth)acrylate, PO-modified trimethylolpropane tri(meth)acrylate, EO, PO modified trimethylolpropane tri(meth)acrylate, pentaerythritol tri(meth)acrylate, pentaerythritol tetra(meth)acrylate, ethylene glycol di(meth)acrylate, tetraethylene glycol di(meth)acrylate, polyethylene glycol di(meth)acrylate, polypropylene glycol di(meth)acrylate, 1,4-butanediol di(meth)acrylate, 1,6-hexanediol di(meth)acrylate, neopentyl glycol di(meth)acrylate, tris(2-hydroxyethyl)isocyanurate tri(meth)acrylate, tris (acryloyloxy)isocyanurate, bis(hydroxymethyl) tricyclodecane di(meth)acrylate, dipentaerythritol penta (meth)acrylate, dipentaerythritol hexa(meth)acrylate, EO-modified 2,2-bis(4-((meth)acryloxy)phenyl)propane, PO-modified 2,2-bis(4-((meth)acryloxy)phenyl)propane, EO,PO-modified 2,2-bis(4-((meth)acryloxy)phenyl)propane, phenylethylene glycol di(meth)acrylate, o-xylylene di(meth)acrylate, m-xylylene di(meth)acrylate, and p-xylylene di(meth)acrylate.

The acrylic resin of the present embodiment preferably has no unsaturated bond such as a double bond or a triple bond between carbon atoms. That is, carbon atoms in the acrylic resin are preferably bonded each other by a saturated bond (single bond). Presumably, when the acrylic resin has no unsaturated bond between carbon atoms, oxidization does not occur over time, and elasticity can be further maintained.

The acrylic resin used in the present embodiment preferably has a weight average molecular weight of 50,000 or more and 3,000,000 or less, more preferably 200,000 or more and 850,000 or less. Presumably, when the weight average molecular weight is within this range, a composition excellent in chemical resistance and moldability can be obtained.

The compounding ratio of the acrylic resin in the conductive composition of the present embodiment is not particularly limited as long as extensibility is obtained, and it is preferably, for example, about 5.0 to 30.0 mass % based on the entire conductive composition.

Further, the conductive resin composition of the present embodiment can include a resin other than the acrylic resin, and resins such as an epoxy resin, a urethane resin, an acrylic resin, a fluororesin, and a silicone resin can be further added depending on the purpose.

(Conductive Powder)

The conductive composition of the present embodiment can be also used as a wiring material and the like having conductivity and sufficiently low resistance by inclusion of a conductive powder. (Hereinafter, the conductive powder may be referred to as a conductive filler.)

The conductive powder according to the present embodiment is not particularly limited as long as it is a powder having conductivity, and elements such as silver, gold, platinum, palladium, copper, nickel, aluminum, magnesium, tungsten, cobalt, zinc, brass, molybdenum, tantalum, niobium, iron, tin, chromium, lead, titanium, manganese, stainless, and nichrome; and oxides, nitrides, carbides, and alloys and the like containing these elements can be used. Those obtained by partially or wholly coating the surface of these conductive powders or polymer material powders with these conductive elements, or oxides, nitrides, carbides, alloys and the like containing these elements can be also used. Among them, silver, copper and the like can be preferably used from the viewpoint of conductivity and cost. These can be used alone or in combination of two or more.

The shape of the conductive powder according to the present embodiment is not particularly limited, and it is preferably a flat shape from the viewpoint of conductivity. For example, the aspect ratio between the thickness and the in-plane longitudinal direction is preferably 10 or more. When the aspect ratio is 10 or more, the surface area of the conductive powder becomes large and the conductivity is easily obtained. When the aspect ratio is 1000 or less, it is preferably 10 or more and 1000 or less, and more preferably 20 or more and 500 or less from the viewpoint of obtaining better conductivity and printability. Examples of the conductive filler having such an aspect ratio include a conductive filler having a tap density measured by tap method of 6.0 g/cm$^3$ or less. Further, when the tap density is 2.0 g/cm$^3$ or less, the aspect ratio is further increased. Thus, the tap density of 2.0 g/cm$^3$ or less is preferable.

The particle size of the conductive powder in the embodiment is not particularly limited, and, for example, from the viewpoint of printability during screen printing, the average particle size measured by the laser light scattering method (the particle size at 50% cumulative volume; D50) is preferably 0.1 μm or more and 30.0 μm or less, more preferably 1.0 μm or more and 10 μm or less.

The surface of the conductive powder in the embodiment can be subjected to a coupling treatment. Alternatively, the resin composition of the present embodiment can contain a coupling agent. Thereby, the adhesiveness between the binder resin and the conductive filler is advantageously further improved. The coupling agent added to the resin composition or used for the coupling treatment of a conductive filler is not particularly limited as long as it adsorbs to or reacts with the filler surface, and specific examples thereof include a silane coupling agent, a titanate coupling agent, and an aluminum coupling agent. When the coupling agent is used in the present embodiment, the addition amount is preferably about 1 mass % to 20 mass % relative to the entire conductive composition.

The compounding ratio of the conductive powder in the conductive composition of the present embodiment is not particularly limited as long as conductivity is obtained, and for example, in the mass ratio for the acrylic resin, the mass ratio of the acrylic resin to the conductive powder is preferably in the range of 30:70 to 5:95. Presumably, when the mass ratio is within the above-mentioned range, the resistance value does not become too large, and the extensibility after curing of the composition is excellent. A more preferable mass ratio is acrylic resin:conductive powder=25:75 to 10:90.

In addition to the conductive powder, a conductive or semiconductive auxiliary agent can be added to the conductive composition in the embodiment to further improve conductivity. As such a conductive or semi-conductive auxiliary agent, a conductive polymer, an ionic liquid, carbon black, acetylene black, carbon nanotubes, an inorganic compound used for antistatic agents and the like can be used, and these can be used alone, or two or more of these can be used simultaneously. In particular, when carbon black is used, the elongation at break of the cured product of the resin composition according to the present invention can be advantageously improved.

Further, the conductive composition according to the present embodiment can include other additives such as a curing agent (D), a curing accelerator (curing catalyst) (E), a dispersant (F), a non-conductive powder (G) and the like as long as the effect of the present invention is not impaired.

In addition to the above, a flame retardant, a flame retardant auxiliary agent, a leveling (surface adjustment) agent, a colorant, an aromatic, a plasticizer, a pH adjuster, a viscosity adjuster, an ultraviolet absorber, an infrared absorber, an antioxidant, a preservative, a lubricant, a diluting solvent (H) and the like can be contained as needed.

(Curing Agent (D))

The curing agent that can be used in the present embodiment is not particularly limited as long as it functions as an epoxy curing agent. Specific examples thereof include a phenol resin, an amine compound, an acid anhydride, an imidazole compound, a sulfide resin, dicyandiamide, a mercapto compound, an onium salt, and a peroxide. A light/ultraviolet curing agent, a thermal cation curing agent and the like can also be used. These can be used alone or in combination of two or more depending on the situation. The addition amount of the curing agent (D) is appropriately set according to the epoxy equivalent.

(Curing Accelerator (E))

The curing accelerator that can be used in the present embodiment is not particularly limited, and, for example, imidazoles and derivatives thereof, organic phosphorus compounds, metal soaps such as zinc octanoate, secondary amines, tertiary amines, quaternary ammonium salts and the like can be used. These can be used alone or in combination of two or more depending on the situation.

When the curing accelerator (E) is used, it is preferably used so that the content thereof will be 0.01 to 1 mass % relative to the acrylic resin contained in the conductive composition.

(Dispersant (F))

To the conductive composition of the present embodiment, (F) a dispersant is preferably further added to improve the dispersion stability of the conductive powder and the resin. The dispersant is not particularly limited as long as it functions as a dispersant, and examples thereof include a copolymer containing an acid group, a pigment affinity block copolymer, a phosphoric ester compound, a polyether phosphoric ester compound, a fatty ester compound, an alkylene oxide copolymer, a modified polyether polymer, a fatty acid derivative, and a urethane polymer.

Examples of the commercially available dispersant include DISPERBYK series manufactured by BYK-Chemie; SOLSPERSE series manufactured by Lubrisol Japan; Sokalan, Tamol, Efka series manufactured by BASF Japan K.K.; Nuosperse series manufactured by Elementis plc; DISPARLON series manufactured by Kusumoto Chemicals, Ltd.; FLOWLEN series manufactured by KYOEISHA CHEMICAL Co., LTD; and AJISPER series manufactured by Ajinomoto Fine-Techno Co., Inc. These can be used alone or in combination of two or more depending on the situation. These are preferably used so that the content of dispersant will be 0.01 to 10 mass % relative to the conductive powder contained in the conductive composition.

(Non-Conductive Powder (G))

To the composition of the present embodiment, a non-conductive powder can be added to impart dispersion stability of the conductive powder and thixotropy for proper printing. Thereby, a conductive pattern having a high print quality with little variation can be obtained in the present embodiment. An appropriate hardness can be imparted to the composition, and the restorability (reversion) after extension can be improved. The non-conductive powder that can be used in the present embodiment is not particularly limited, and examples thereof include silica, alumina, titanium oxide, barium titanate, magnesium titanate, calcium titanate, strontium titanate, zinc oxide, tin oxide, silica sand, clay, mica, wollastonite, diatomaceous earth, chromium oxide, cerium oxide, red lead paint, antimony trioxide, magnesium oxide, zirconium oxide, barium sulfate, barium carbonate, calcium carbonate, silicon carbide, and silicon nitride. These can be used alone or in combination of two or more depending on the situation. When the non-conductive powder (G) is added, it is preferably used so that the content thereof will be 0.1 to 10 mass % relative to the acrylic resin contained in the conductive composition.

(Diluting Solvent (H))

The composition can be used in the form of paste or varnish by addition of a diluting solvent. That is, in the present embodiment, a diluting solvent is preferably further used to control the workability during printing and pot life. As the diluting solvent, organic solvents of hydrocarbon, ketone, ester, ether, glycol, glycol ester, glycol ether, glyme and the like can be used, and these can be used alone or in combination of two or more.

Specific examples of the hydrocarbon solvent include toluene, xylene, solvent naphtha, hexane, isohexane, cyclohexane, ethylcyclohexane, methylcyclohexane, heptane, isooctane, decane, pentane, isopentane, and isododecane.

Specific examples of the ketone solvent include acetone, methyl ethyl ketone, methyl isobutyl ketone, diisobutyl ketone, cyclohexanone, and diacetone alcohol.

Specific examples of the ester solvent include ethyl acetate, methyl acetate, butyl acetate, methoxybutyl acetate, amyl acetate, propyl acetate, isopropyl acetate, ethyl lactate, methyl lactate, and butyl lactate.

Specific examples of the ether solvent include isopropyl ether, methyl cellosolve, ethyl cellosolve, butyl cellosolve, dioxane, and methoxymethylpropane.

Specific examples of the glycol solvent include ethylene glycol, diethylene glycol, triethylene glycol, and propylene glycol.

Specific examples of the glycol ester solvent include ethylene glycol monoethyl ether acetate, propylene glycol monomethyl ether acetate, diethylene glycol monobutyl ether acetate, and diethylene glycol monoethyl ether acetate.

Specific examples of the glycol ether solvent include methyl carbitol, ethyl carbitol, butyl carbitol, methyl triglycol, propylene glycol monomethyl ether, propylene glycol monobutyl ether, methoxymethyl butanol, diethylene glycol monohexyl ether, propylene glycol monomethyl ether propionate, and dipropylene glycol methyl ether.

Specific examples of the glyme solvent include ethylene glycol dimethyl ether, diethylene glycol dimethyl ether, ethylene glycol diethyl ether, diethylene glycol diethyl ether, triethylene glycol dimethyl ether, diethylene glycol dibutyl ether, dimethoxytetraethylene glycol, and dipropylene glycol dimethyl ether.

Other solvents include dichloromethane, trichlorethylene, perchlorethylene, γ-butyrolactam, ethylpyrrolidone, methylpyrrolidone, tetrahydrofuran, dimethylformamide, dibasic acid ester, ethyl ethoxy propionate, tetramethylene sulfone, dimethyl carbonate, diethyl carbonate, styrene monomer, acetonitrile, dioxolane, γ-butyrolactone, dimethyl sulfoxide, dioctyl phthalate, diisonyl phthalate, dibutyl phthalate, dimethyl succinate, and diethyl succinate. These can be used alone or in combination of two or more depending on the situation.

(Method for Preparing Conductive Composition)

The method for preparing the conductive composition of the present embodiment is not particularly limited, and for example, the conductive composition of the present embodiment can be obtained by uniformly mixing and stirring the above-mentioned resin component and the conductive powder; a curing agent and a dispersant as needed; and a solvent. The method of mixing and stirring is not particularly limited, and a high shear dispersing device such as a rotation-revolution mixer or a three-roll mill is preferably used. Further, vacuum degassing can be performed.

(Use)

The cured product of the conductive composition of the present embodiment dose not lose conductivity even when it is repeatedly contracted and expanded, and, in addition, has low resistance change caused by deformation. Thus, the molded body, the cured product of the conductive composition of the present embodiment, can be used for electronic applications, and as materials for various electronic parts in various applications. Specifically, for example, it can be suitably used for stretchable electrodes, displays as wiring circuits, foldable electronic paper, touch panels, touch sensors, solar cells and the like.

That is, the present invention also includes a conductive structure including the conductive composition. The conductive composition and the conductive structure according to the present invention can be also applied to various technical fields such as IoT, optical fields, electronic fields, adhesive fields, and medical fields, and thus are very advantageous for industrial use.

(Formation of Conductive Patterns and the Like and Electronic Circuit Members Including the Same)

The conductive resin composition of the present embodiment can be applied or printed on a base material such as a film or a woven fabric to form a coating film of the conductive resin composition, thereby a desired conductive pattern or conductive film can be formed. The present invention also includes an electronic circuit member having such a conductive pattern or conductive film.

In the present embodiment, various films and woven fabrics can be used as the base material on which the conductive pattern and the conductive film are formed. Specifically, for example, in addition to organic films of polyester, polypropylene, polycarbonate, polyethylene sulfone, urethane, silicon or the like, fiber reinforced plastics such as those used in printed wiring boards, and woven fabrics that are made of fibers such as polyester, rayon, acrylic, wool, cotton, hemp, silk, polyurethane, nylon, and cupra, and to which the conductive resin composition can be applied or which can withstand printing can be used without particular limitation.

The conductive pattern, the conductive film and the like can be formed by the following steps. That is, first, the resin composition of the present embodiment is applied or printed on a base material to form a coating film, and volatile components contained in the coating film are removed by drying. By the subsequent curing step such as heating, electron beam, and light irradiation, the step of curing the acrylic resin component and the curing agent, and the step of reacting the coupling agent and (C) the conductive filler, a conductive film or conductive pattern can be formed. The conditions in the curing steps and the reaction step are not particularly limited, and can be appropriately set depending on the type of the resin, the curing agent, the filler and the like, and the desired form.

The step of applying the conductive composition of the present embodiment on the base material is not particularly limited, and, for example, coating methods in which an applicator, a wire bar, a comma roll, a gravure roll or the like is used, and printing methods in which a screen, a flat plate offset, a flexo, an inkjet, stamping, a dispenser, a squeegee or the like is used can be used.

Hereinafter, though the present invention will be described further specifically with reference to Examples, the scope of the present invention is not limited thereto.

EXAMPLES

The various materials used in the Examples are as follows.

(Acrylic Resin)

A product obtained by dissolving and diluting an acrylic resin composed of isobornyl acrylate, acrylonitrile, glycidyl methacrylate, and an acrylic monomer represented by the following formula (1) with ethyl carbitol ("PMS-14-56" manufactured by Nagase ChemteX Corporation, solid ratio of 30.0 mass %) was used.

[Chemical formula 2]

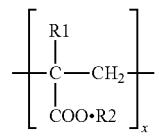

(1)

In the above formula (1), R1 is hydrogen or a methyl group, and R2 is hydrogen or an alkyl group.

(Conductive Powder)

Silver powder ("Ag-XF-301K" manufactured by Fukuda Metal Foil & Powder Co., Ltd.)

Carbon black ("ECP200L" manufactured by Lion Specialty Chemicals Co., Ltd.)

(Curing Accelerator)

Imidazole curing accelerator ("2E4MZ" manufactured by SHIKOKU CHEMICALS CORPORATION, 2-ethyl-4-methyl imidazole)

(Dispersant)

Wet dispersant ("DISPERBYK-2155" manufactured by BYK-Chemie Japan)

Carbon black dispersant ("BYK-9076" manufactured by BYK-Chemie Japan)

(Non-Conductive Powder)

Silica fine powder ("RX200" manufactured by NIPPON AEROSIL CO., LTD.)

[Composition of Resin]

The resins used in Examples and Comparative Examples are Resins 1 to 14 having compounding compositions (parts by mass) shown in Table 1. Glycidyl methacrylate was added so that the epoxy equivalent in the total amount of acrylate would be the value shown in the Table (all less than 0.1 mass %).

TABLE 1

| | Resin 1 | Resin 2 | Resin 3 | Resin 4 | Resin 5 | Resin 6 | Resin 7 | Resin 8 | Resin 9 | Resin 10 | Resin 11 | Resin 12 | Resin 13 | Resin 14 |
|---|---|---|---|---|---|---|---|---|---|---|---|---|---|---|
| Isobornyl acrylate | 10 | 10 | 20 | 20 | 50 | 5 | 20 | 20 | 20 | 20 | 0 | 0 | 60 | 20 |
| Acrylonitrile | 10 | 20 | 10 | 20 | 10 | 10 | 10 | 10 | 5 | 30 | 10 | 20 | 10 | 10 |
| Compound A | 80 | 70 | 70 | 60 | 70 | 85 | 70 | 70 | 80 | 50 | 90 | 80 | 10 | 70 |
| Epoxy equivalent [g/eq] | 4762 | 4762 | 4762 | 4762 | 4762 | 4762 | 9091 | 1852 | 4762 | 4762 | 4762 | 4762 | 4762 | 0 |

[Preparation of Conductive Composition]

The compounding composition amounts (parts by mass) shown in Table 2 were added to a solvent (diethylene glycol monoethyl ether acetate) so that the solid content of the composition would be about 70 mass %, and the mixture was uniformly mixed by stirring with a rotation-revolution mixer ("ARV-310" manufactured by THINKY CORPORATION, 2000 rpm-3 minutes), and then degassed by setting the pressure at 2.6 kPa and stirring for 1 minute to prepare the conductive compositions of Examples 1 to 16 and Comparative Examples 1 to 4.

TABLE 2

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Resin | Resin 1 | 17.95 | | | | | | | | | | |
| | Resin 2 | | 17.95 | | | | | | | | | |
| | Resin 3 | | | 17.95 | | | | | | | | 16.16 |
| | Resin 4 | | | | 17.95 | | | | | | | |
| | Resin 5 | | | | | 17.95 | | | | | | |
| | Resin 6 | | | | | | 17.95 | | | | | |
| | Resin 7 | | | | | | | 17.95 | | | | |
| | Resin 8 | | | | | | | | 17.95 | | | |
| | Resin 9 | | | | | | | | | 17.95 | | |
| | Resin 10 | | | | | | | | | | 17.95 | |
| | Resin 11 | | | | | | | | | | | |
| | Resin 12 | | | | | | | | | | | |
| | Resin 13 | | | | | | | | | | | |
| | Resin 14 | | | | | | | | | | | |
| Dispersant | DISPERBYK-2 | 1.61 | 1.61 | 1.61 | 1.61 | 1.61 | 1.61 | 1.61 | 1.61 | 1.61 | 1.61 | 1.61 |
| Curing accelerator | 2E4MZ | 0.06 | 0.06 | 0.06 | 0.06 | 0.06 | 0.06 | 0.06 | 0.06 | 0.06 | 0.06 | 0.06 |
| Curing agent | D2000 | | | | | | | | | | | 1.79 |
| Non-conductive fine particles | RX200 | | | | | | | | | | | |
| Carbon black | ECP200L | | | | | | | | | | | |
| Dispersant | BYK-9076 | | | | | | | | | | | |
| Silver powder | Ag-XF-301K | 80.38 | 80.38 | 80.38 | 80.38 | 80.38 | 80.38 | 80.38 | 80.38 | 80.38 | 80.38 | 80.38 |

| | | Example | | | | | Comparative Example | | | |
|---|---|---|---|---|---|---|---|---|---|---|
| | | 12 | 13 | 14 | 15 | 16 | 1 | 2 | 3 | 4 |
| Resin | Resin 1 | | | | | | | | | |
| | Resin 2 | | | | | | | | | |
| | Resin 3 | 17.95 | 28.45 | 7.21 | 17.95 | 17.95 | | | | |
| | Resin 4 | | | | | | | | | |
| | Resin 5 | | | | | | | | | |

TABLE 2-continued

|  |  |  |  |  |  |  |  |  |  |  |
|---|---|---|---|---|---|---|---|---|---|---|
| Resin 6 |  |  |  |  |  |  |  |  |  |  |
| Resin 7 |  |  |  |  |  |  |  |  |  |  |
| Resin 8 |  |  |  |  |  |  |  |  |  |  |
| Resin 9 |  |  |  |  |  |  |  |  |  |  |
| Resin 10 |  |  |  |  |  |  |  |  |  |  |
| Resin 11 |  |  |  |  |  | 17.95 |  |  |  |  |
| Resin 12 |  |  |  |  |  |  | 17.95 |  |  |  |
| Resin 13 |  |  |  |  |  |  |  | 17.95 |  |  |
| Resin 14 |  |  |  |  |  |  |  |  | 17.95 |  |
| Dispersant | DISPERBYK-2 | 1.61 | 2.21 | 0.41 | 1.61 |  | 1.61 | 1.61 | 1.61 | 1.61 |
| Curing accelerator | 2E4MZ | 0.06 | 0.10 | 0.02 | 0.06 | 0.06 | 0.06 | 0.06 | 0.06 | 0.06 |
| Curing agent | D2000 |  |  |  |  |  |  |  |  |  |
| Non-conductive fine particles | RX200 | 1.61 |  |  |  |  |  |  |  |  |
| Carbon black | ECP200L |  |  |  | 1.82 | 5.39 |  |  |  |  |
| Dispersant | BYK-9076 |  |  |  | 0.73 | 2.15 |  |  |  |  |
| Silver powder | Ag-XF-301K | 80.38 | 69.74 | 95.03 | 90.81 | 0.00 | 80.38 | 80.38 | 80.38 | 80.38 |

[Evaluation]

(Volume Resistance Value)

The conductive resin composition of the Examples and Comparative Examples obtained above was applied on a PET base material (PET-O2-BU manufactured by Mitsui Chemicals Tohcello. Inc.) with an applicator (standard film thickness: 200 μm, manufactured by T.P Giken), and heated in an electric oven at 100° C. for 10 minutes and 170° C. for 60 minutes.

The film thickness of the obtained samples in the Examples and Comparative Examples was measured with a micrometer (MDC-MXD, manufactured by Mitutoyo Corporation). The value of the film thickness was input to a resistivity meter (MCP-T370, manufactured by Nittoseiko Analytech Co., Ltd.), and the volume resistivity of the surface was measured by the 4-terminal method. The average of the measurement results of 5 or more points was used as the volume resistance value.

(Elastic Modulus and Elongation at Break)

The conductive resin composition of the Examples and Comparative Examples obtained above was applied on a PET base material (PET-O2-BU manufactured by Mitsui Chemicals Tohcello. Inc.) with an applicator (standard film thickness: 200 μm, manufactured by T.P Giken), and heated in an electric oven at 100° C. for 10 minutes and 170° C. for 60 minutes.

The film thickness of the obtained samples in the Examples and Comparative Examples was measured with a micrometer (MDC-MXD, manufactured by Mitutoyo Corporation). Each sample obtained in the Examples and Comparative Examples was cut into a test shape (SDMK-1000, manufactured by DUMBBELL CO., LTD.) using a cutting machine (SDL-100, manufactured by DUMBBELL CO., LTD.). Then, the sample peeled from the PET film was placed on a desktop precision universal testing machine (Autograph AGS-X, manufactured by Shimadzu Corporation). A tensile test was performed at a moving speed of 25 mm/sec, and the elastic modulus was calculated from the value at 5% extension. The average of the measurement results of 3 or more points was used as the elastic modulus. The elongation was calculated from the movement amount when the film broke and the stress became 0, and was taken as the elongation at break. The average of the measurement results of 3 or more points was used as the elongation at break.

(Break Resistance During Extension)

A thin wire having a width of 1 mm and a length of 13 mm of the conductive resin composition in the Examples and Comparative Examples obtained above was printed on a urethane film (ST-604, manufactured by Bemis Company, Inc.) using a screen plate, and heated in an electric oven at 100° C. for 10 minutes and 170° C. for 60 minutes.

The obtained sample in the Examples and Comparative Examples was fixed on a high precision automatic stage at an interval of 80 mm. The sample was extended at 0.1 mm/sec while measuring the resistance value using a digital multimeter (PC720M, manufactured by SANWA ELECTRIC INSTRUMENT CO., LTD.) at both ends of the sample. The elongation at break of the wire was calculated from the movement amount of the stage when the conductive composition broke and the circuit was opened, and evaluated in four levels.

Excellent: 100% or more

Good: 75% or more and less than 100%

Fair: 50% or more and less than 75%

Poor: less than 50%

(Resistance Value Stability at 20% Contraction and Expansion)

A thin wire having a width of 1 mm and a length of 13 mm of the conductive resin composition in the Examples and Comparative Examples obtained above was printed on a urethane film (ST-604, manufactured by Bemis Company, Inc.) using a screen plate, and heated in an electric oven at 100° C. for 10 minutes and 170° C. for 60 minutes.

The obtained sample in the Examples and Comparative Examples was fixed on a high precision automatic stage at an interval of 80 mm. Contraction and expansion were repeated 1000 times at a movement amount of 16 mm at 6.4 mm/sec while measuring the resistance value using a digital multimeter (PC720M, manufactured by SANWA ELECTRIC INSTRUMENT CO., LTD.) at both ends of the sample. The ratio RE/RS between the resistance value before the start of the test, RS, and the resistance value immediately before the end of the test, RE, was calculated and evaluated in four levels.

Excellent: less than 100

Good: 100 or more and less than 200

Fair: 200 or more and less than 300

Poor: 300 or more (Heat Resistance)

A thin wire having a width of 1 mm and a length of 13 mm of the conductive resin composition in the Examples and Comparative Examples obtained above was printed on a polyimide film (UPILEX S, manufactured by UBE INDUSTRIES, LTD.) using a screen plate, and heated in an electric oven at 100° C. for 10 minutes and 170° C. for 60 minutes.

The obtained sample in the Examples and Comparative Examples was attached to a carrier (Magi Carrier) and heated in an electric oven at 260° C. for 5 minutes. Immediately after the sample was taken out, a weight of 10 g was placed on the thin wire and left for 1 minute, the trace of the removed weight was visually evaluated.

Good: No abnormality

Poor: Abnormalities such as traces and peeling

Results of the evaluation test above are summarized in Table 3.

formed. Results of Comparative Example 4 in which the resin 14 not containing the acrylate having an epoxy group was used showed poor heat resistance.

This application is based on Japanese Patent Application No. 2018-69000 filed on Mar. 30, 2018, the contents of which are incorporated herein.

It is to be understood that though the present invention has been described appropriately and sufficiently through

TABLE 3

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Volume resistivity [*10^-3 ohm-cm] | 2.3 | 1.1 | 0.9 | 1.2 | 1.5 | 1.8 | 1.8 | 2.0 | 2.5 | 1.9 | 1.4 |
| Elastic modulus [MPa] | 15.1 | 37.5 | 24.8 | 60.0 | 39.1 | 11.8 | 14.7 | 44.3 | 11.8 | 75.4 | 9.9 |
| Elongation at break [%] | 287.8 | 380.9 | 290.9 | 209.2 | 281.5 | 274.9 | 352.7 | 212.5 | 335.3 | 92.1 | 135.6 |
| Break resistance during extension | excellent | excellent | excellent | good | excellent | excellent | excellent | good | good | good | excellent |
| Resistance value stability at 20% contraction and expansion | good | excellent | Excellent | excellent | excellent | good | good | excellent | good | excellent | good |
| Heat resistance | good | good | good | good | good | good | good | good | good | good | good |

| | | Example | | | | | Comparative Example | | | |
|---|---|---|---|---|---|---|---|---|---|---|
| | | 12 | 13 | 14 | 15 | 16 | 1 | 2 | 3 | 4 |
| | Volume resistivity [*10^-3 ohm-cm] | 1.8 | 15.9 | 0.2 | 0.6 | 1900 | 1.5 | 0.2 | 1.4 | 2.1 |
| | Elastic modulus [MPa] | 59.5 | 12.4 | 74.0 | 38.5 | 13.8 | 14.8 | Broken | 4.3 | 0.9 |
| | Elongation at break [%] | 35.9 | 305.3 | 42.7 | 244.4 | >1000 | 73.9 | 1.7 | 45.9 | 41.8 |
| | Break resistance during extension | good | excellent | good | excellent | excellent | fair | poor | poor | poor |
| | Resistance value stability at 20% contraction and expansion | excellent | good | excellent | excellent | excellent | poor | poor | poor | poor |
| | Heat resistance | good | good | good | good | good | good | good | good | poor |

(Results/Discussion)

The results above showed that the conductive composition according to the present invention is excellent in elastic modulus, does not break even when it is greatly expanded, and is excellent in break resistance during extension. It was confirmed that the resistance value was stable even after repeated contraction and expansion.

On the other hand, results in Comparative Examples 1 and 2 in which the resin 11 and resin 12 not containing (meth) acrylate having an isobornyl group which is a polymer unit (B) component are used showed poor break resistance during extension and resistance value stability during contraction and expansion. In particular, in Comparative Example 2, the sample broke during the tensile test, and it was impossible to measure the elastic modulus. Presumably this is because there is no isobornyl group that imparts the effect of steric hindrance, and thus the contribution of the hydrogen bonding property of acrylonitrile increased, resulting in a hard and brittle cured product. Meanwhile, also in Comparative Example 3 in which the resin 13 having an excessively large content of the polymer unit (B) was used, neither sufficient break resistance during extension nor resistance value stability during contraction and expansion was obtained. Presumably this is because the isobornyl group occupying a large part reduced the reactivity of the epoxy group, and a sufficient heat curing reaction was not perembodiments with reference to specific examples and drawings above to express the present invention, it is easy for a person skilled in the art to change and/or improve the above-mentioned embodiments. Therefore, unless a modification or improvement made by a person skilled in the art is not at a level that departs from the scope of the claims set forth in the claims, such a modification or improvement shall be construed as being included in the scope of the claims.

INDUSTRIAL APPLICABILITY

The present invention has wide industrial applicability in the technical field of electronic materials and various devices including the same.

The invention claimed is:

1. A conductive composition at least comprising an acrylic resin and a conductive powder,
   wherein the acrylic resin contains a polymer unit (A) of a (meth)acrylate having an epoxy group and a polymer unit (B) of a (meth)acrylate having an isobornyl group, and
   an amount of the polymer unit (B) is 5.0 parts by mass or more and 50.0 parts by mass or less based on 100 parts by mass of the acrylic resin,
   wherein a mass ratio of the acrylic resin to the conductive powder is in a range of 30:70 to 5:95.

2. The conductive composition according to claim 1, wherein an epoxy equivalent of the polymer unit (A) based on a total amount of the acrylic resin is in a range of 400 to 10,000 g/eq.

3. The conductive composition according to claim 1, wherein the acrylic resin further contains a polymer unit (C) of a (meth)acrylate having a nitrile group.

4. The conductive composition according to claim 3, comprising 5.0 parts by mass or more and 30.0 parts by mass or less of the polymer unit (C) based on 100 parts by mass of the acrylic resin.

5. The conductive composition according to claim 1, further comprising a curing agent (D).

6. The conductive composition according to claim 1, further comprising a curing accelerator (E).

7. The conductive composition according to claim 1, further comprising a dispersant (F).

8. The conductive composition according to claim 1, further comprising a non-conductive powder (G).

9. A conductive structure comprising the conductive composition according to claim 1.

* * * * *